J. T. ROBERTS.
ARTIFICIAL FUEL.
APPLICATION FILED FEB. 28, 1916.
1,193,070.
Patented Aug. 1, 1916.
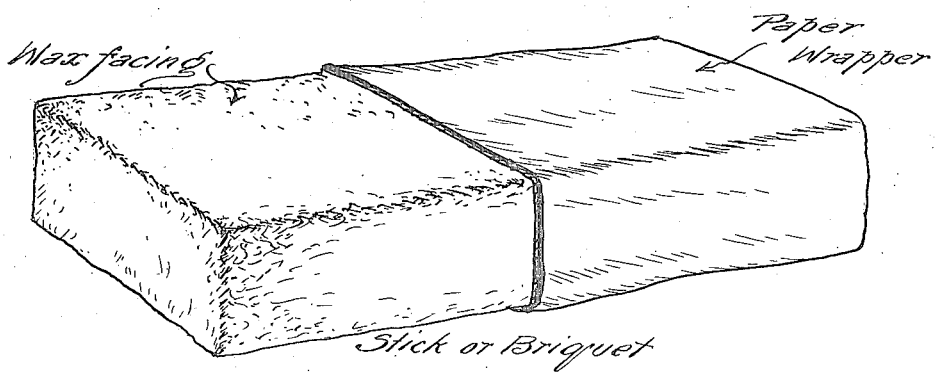
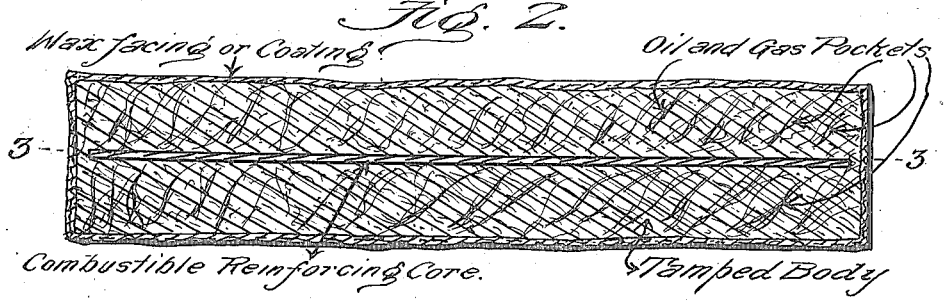
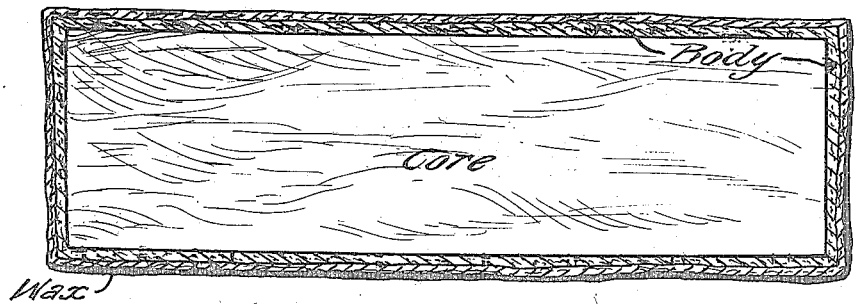

UNITED STATES PATENT OFFICE.

JOHN T. ROBERTS, OF WASHINGTON, DISTRICT OF COLUMBIA.

ARTIFICIAL FUEL.

1,193,070.            Specification of Letters Patent.        Patented Aug. 1, 1916.

Application filed February 28, 1916. Serial No. 80,864.

*To all whom it may concern:*

Be it known that I, JOHN T. ROBERTS, a citizen of the United States, residing at Washington, in the District of Columbia, have invented new and useful Improvements in Artificial Fuel, of which the following is a specification.

This invention relates to an artificial fuel and a method of making or cohering the same.

An object of the invention is to produce an artificial fuel in the form of a stick or briquet including a body of combustible material and a binder of plastic material so compounded and associated as to produce an article which will retain its form and integrity under all atmospheric conditions and which will give a high and prolonged degree of heat with a minimum of smoke.

It is a further object of the invention to produce an artificial fuel by combining and mixing a number of combustible elements with a suitable binding substance, to wet the same and to mix all of the elements when in a substantially semi-plastic state and to form the same into briquets within each of which is centrally arranged a core also of a combustible nature and after permitting the briquets to dry, to immerse the same in a gaseous fluid, such as a body of kerosene or the like and whereby all of the pores of the briquet will be impregnated by the fluid and the gases thereof, after which the briquet is permitted to dry and is given a coating of an impervious substance which is ignitible but not highly inflammable, such, for instance, as melted wax, and whereby the oil or gases from the oil will be held in the briquet and permitted to escape therefrom only in accordance with the volume at which the same is consumed by a flame when the briquet is ignited.

It is a still further object of the invention to produce an artificial fuel in the form of sticks or briquets which shall be simple and cheap to manufacture, which can be easily and conveniently handled and which will produce a lasting and uniform volume of heat.

For the purpose of illustrating my invention I have shown in the accompanying drawings a satisfactory reduction of the improvement to practice, and in which:

Figure 1 is a perspective view of my artificial fuel in the form of a briquet, Fig. 2 is a central longitudinal sectional view through the same, and Fig. 3 is a horizontal sectional view approximately on the line 3—3 of Fig. 2.

For each one hundred pounds of my fuel I employ ingredients proportioned substantially as follows:

For the fuel proper I employ crushed coke, 23 pounds, charcoal (crushed) 13 pounds, coal dust 9 pounds and rosin (crushed) 10 pounds.

For the binder or body I employ magnesia, 5 pounds, sawdust 20 pounds and asbestos cement, 5 pounds, and for the core or central reinforcing member I employ strips of combustible material such as wood, cardboard or the like equaling 5 pounds.

The fuel and the body or binder are saturated and all of these ingredients are mixed together. This plastic substance is placed in a suitable mold, approximately filling one-half of the mold, when the reinforcing member is inserted in the mold longitudinally thereof and upon the plastic substance. The substance may be tamped before the reinforcing member or core is arranged thereon, and the mold is then filled with additional plastic substance and the said substance tamped. The briquet thus formed is placed upon a drying board and the same may be subjected to heat. When the briquet is thoroughly dried the same is immersed in a gaseous fluid, such as a body of kerosene oil, and the oil penetrates all of the pores of the briquet. When the briquet has its outer surface wholly dried of the oil, the same is then immersed in a bath of melted wax which serves to retain the gases from the oil or the oil itself in the pores of the briquet as well as a preservative for the briquet and the gases or oil escape only as the same are consumed by the flame when the briquet is ignited.

As a further preservative for the briquet, the same may be wrapped in paper which preferably has been waxed or oiled, and also the same may be subjected to a bath in the melted wax after being arranged upon the briquet. This renders the briquet non-susceptible to deteriorating influence by the elements, should the same be exposed to snow, sleet, water, etc., and as the wrapper is combustible it provides a kindling element for the briquet.

While the sawdust has been referred to as one of the binding or body elements of the fuel, the same is, of course, of a combustible nature and with the remaining elements will add to the intensity of the heat and the length of duration of the flame.

The briquet it is to be understood, presents a highly porous body and the outer ignitible facing is essential for retaining the gases in the pores of the body. The centrally disposed reinforcing member or core comprises a thin substantially rectangular strip which is wholly embedded in the body terminating only a short distance from the ends and edges of the said body and consequently reinforces the body for the entire length thereof. The arrangement of the reinforcing member is important as should the facing or outer coating become broken by the bending of the body, the gases will escape from the pores of the said body rendering the fuel defective.

What I claim is:

In an artificial fuel, a briquet comprising a substantially rectangular porous body and having the pores thereof filled with a gaseous oil, an impervious coating for the body to retain the oil and gases therefrom in the pores of the body, and a substantially rectangular reinforcing member of ignitible material centrally and longitudinally embedded within said body and having its ends and edges terminating only a short distance from the ends and edges of the body, whereby to effect in preventing the breaking of the briquet and the coating thereon when subjected to pressure from any direction.

In testimony whereof, I affix my signature in the presence of two witnesses.

JOHN T. ROBERTS.

Witnesses:
WM. J. KOERTH,
BENNETT S. JONES.